Jan. 4, 1927.
H. H. SEAMAN
SUNSHADE
Filed May 22, 1925
1,613,296
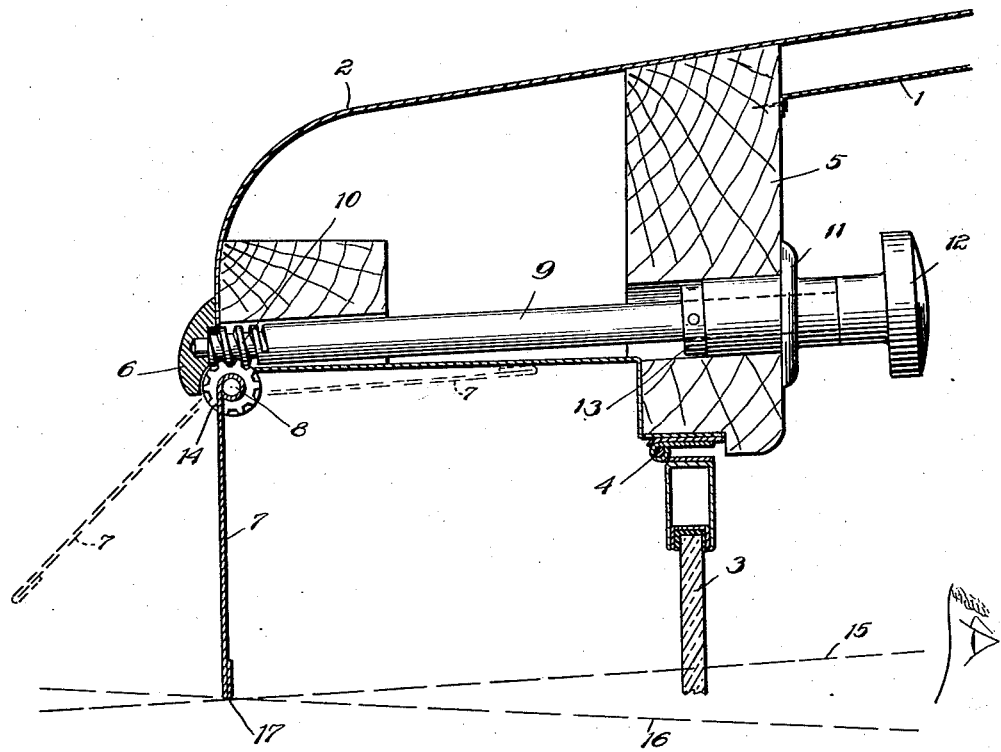
Inventor
Harold H. Seaman Patented Jan. 4, 1927.

1,613,296

UNITED STATES PATENT OFFICE.

HAROLD H. SEAMAN, OF MILWAUKEE, WISCONSIN, ASSIGNOR TO SEAMAN BODY CORPORATION, OF MILWAUKEE, WISCONSIN, A CORPORATION OF WISCONSIN.

SUNSHADE.

Application filed May 22, 1925. Serial No. 32,010.

This invention relates to improvements in sunshades for vehicles and more particularly to the mounting and arrangement thereof and to the actuating mechanism therefor.

Various types of sunshades or visors for vehicles have been devised for mounting in front of the windshields of motor vehicles to cut out the sun rays from the line of vision, some of these shades being adapted for pivotal movement and adjustment with respect to the windshield to meet varying conditions, but the growing practice at present is to form the visor by a continuation of the roof of the vehicle body. This type of shade or visor, however, is of course not adjustable, while those of the adjustable type are generally mounted directly at the windshield, and for this reason are incapable of adjustment such as will adequately cut out the glare when the rays of the sun approach the horizontal. One of the objects of the present invention, therefore, is to provide an improved adjustable sunshade of the character described which shall be so positioned with reference to the windshield that light rays which are substantially horizontal may be cut out from the line of vision.

Another object is to provide an improved sunshade of the character described which is pivotally mounted to the outer edge of the visor of a vehicle body and which is provided with actuating means mounted within the visor and concealed thereby.

Another object is to provide an improved sunshade of the character described which is simple in construction and which may be manufactured at a comparatively small cost.

Other objects and advantages will hereinafter appear.

The figure of the drawing is a vertical sectional view through the top front portion of a motor vehicle body, showing the manner in which the improved sunshade is mounted and the actuating mechanism therefor.

The vehicle body, designated generally by the reference numeral 1, is provided with a visor 2 of the roof-extension type and the windshield 3 pivotally connected at 4 to the cross member 5, the edge of the visor being provided with a molding or finishing strip 6. The sunshade 7 is fixed to a suitable shaft 8 journaled in any suitable manner so that it may be rocked for adjusting the shade. The actuating mechanism for the sunshade comprises a shaft 9 having the front end thereof provided with a worm 10 and journaled in molding strip 6, as shown, and the rear end thereof journaled in a bearing 11 fitted in member 5, this end of the shaft being provided with an actuating knob 12 and a fixed collar 13 for preventing axial movement of shaft 9 in bearing 11. A worm wheel 14 is fixed to shaft 8 and meshes with worm 10. Upon rotation of knob 12 in either direction the angular relation of the sunshade with respect to visor 2 may be varied, the worm wheel 14 and worm 10 being self-locking so that the sunshade is held in adjusted position.

When in the full line position, the sunshade will cut out rays of light 16 which are substantially horizontal, while not obstructing full view of the road for an ample distance ahead, as shown by dotted line 15, for the reason that the shade 7 is attached for adjustment at a point from windshield 3 considerably removed outwardly. When not needed, the sunshade may be moved up out of view as shown in the dotted line position.

From the foregoing it will be seen that by mounting the sunshade at the edge of visor 2, the lower edge 17 of the sunshade may be arranged an appreciable distance in front of the windshield and above the line of vision while cutting out rays of light which are substantially horizontal.

The shade and actuating mechanism therefor have been shown in connection with a visor of the so-called roof-extension type, but of course it may be associated with visors of various other types, any changes necessary therefore being obvious to those skilled in the art.

The invention claimed is:

In combination with a vehicle having a windshield and a roof projecting therebeyond, of a shade pivotally suspended from the projecting portion of said roof in advance of said windshield, the distance from the free edge of said shade to the pivotal axis therof being less than the distance from said axis to the windshield whereby said shade may be swung up against the underside of said roof in advance of the windshield when not in use, and means housed within the projecting portion of said roof and operable from within the vehicle for swingingly adjusting said shade.

In witness whereof I hereto affix my signature.

HAROLD H. SEAMAN.